United States Patent
Wang et al.

(10) Patent No.: US 9,553,483 B2
(45) Date of Patent: Jan. 24, 2017

(54) SYSTEM AND METHOD FOR LIMITING INRUSH CURRENT IN SOLID STATE DRIVES

(71) Applicant: Toshiba Corporation, Tokyo (JP)

(72) Inventors: Wenwei Wang, San Jose, CA (US); Karl Reinke, Santa Clara, CA (US)

(73) Assignee: Toshiba Corporation, Tokyo (JP)

(*) Notice: Subject to any disclaimer, the term of this patent is extended or adjusted under 35 U.S.C. 154(b) by 513 days.

(21) Appl. No.: 14/195,494

(22) Filed: Mar. 3, 2014

(65) Prior Publication Data

US 2014/0246906 A1    Sep. 4, 2014

Related U.S. Application Data

(60) Provisional application No. 61/771,440, filed on Mar. 1, 2013.

(51) Int. Cl.
| | |
|---|---|
| H02J 1/00 | (2006.01) |
| H02J 9/06 | (2006.01) |
| G06F 1/00 | (2006.01) |
| H02J 7/34 | (2006.01) |
| H02J 7/00 | (2006.01) |

(52) U.S. Cl.
CPC ............ *H02J 9/061* (2013.01); *G06F 1/00* (2013.01); *H02J 7/345* (2013.01); *H02J 2007/0039* (2013.01); *Y10T 307/344* (2015.04)

(58) Field of Classification Search
CPC .................................................. H02J 9/061
USPC ................................................... 307/23
See application file for complete search history.

(56) References Cited

U.S. PATENT DOCUMENTS

| | | | | |
|---|---|---|---|---|
| 5,374,887 A | * | 12/1994 | Drobnik .................. | G05F 1/573 323/299 |
| 5,786,685 A | * | 7/1998 | Lange ....................... | H02J 9/06 307/66 |
| 6,628,107 B1 | * | 9/2003 | Bang ......................... | G06F 1/30 323/266 |
| 7,262,587 B2 | * | 8/2007 | Takimoto ................. | H02M 1/36 323/222 |
| 9,086,333 B2 | * | 7/2015 | Rumer | |

* cited by examiner

*Primary Examiner* — Stephen W Jackson
(74) *Attorney, Agent, or Firm* — White & Case LLP

(57) ABSTRACT

A system and method thereof to regulate a current to a capacitive load from a power supply connected to the capacitive load. The system includes a first switch between the power supply and the capacitive load, a super-capacitor configured for charging by the power supply and powering the capacitive load, a current limiting circuit between the super-capacitor and the power supply, a second switch between the super-capacitor and the capacitive load, and a power control circuit configured to control opening and closing of the first switch and the second switch independently, sense a voltage of the power supply, and sense a voltage of the super-capacitor.

20 Claims, 4 Drawing Sheets

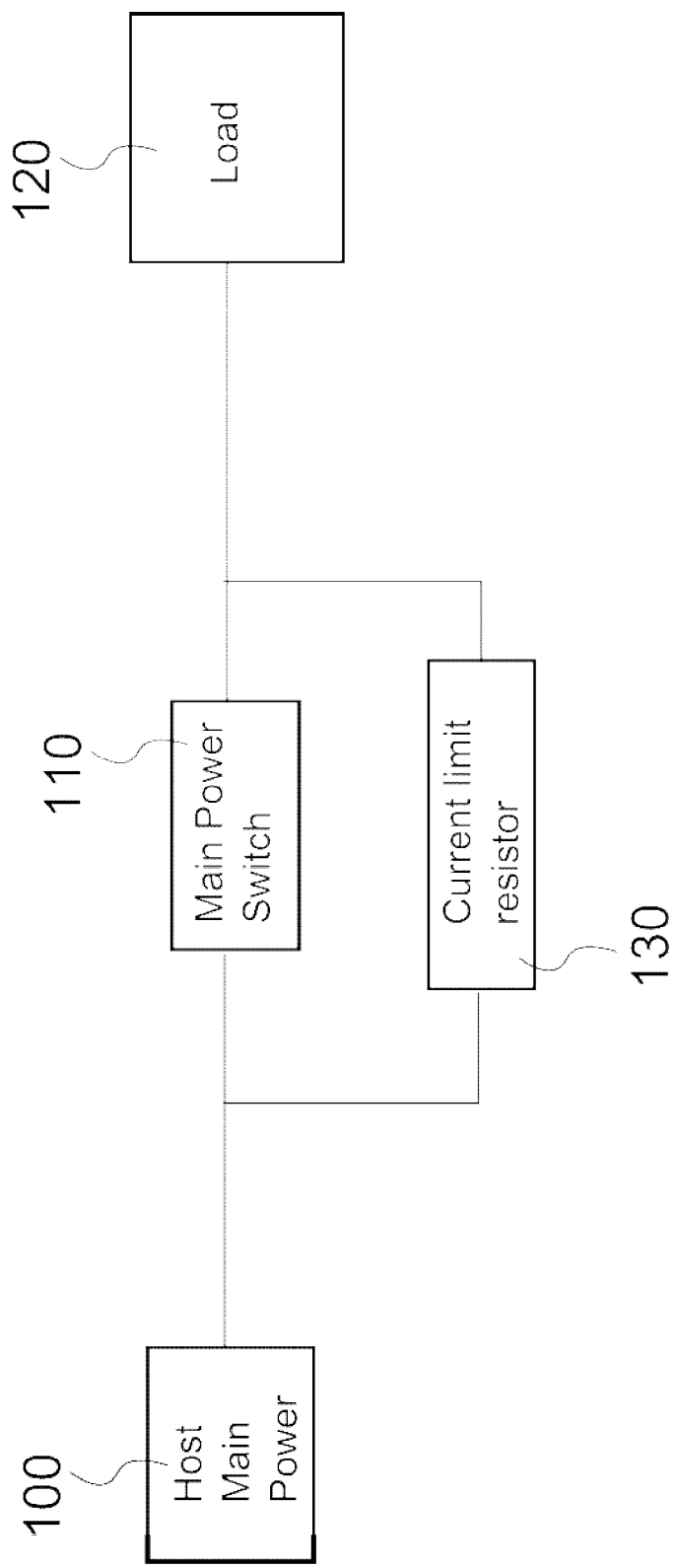

SYSTEM AND METHOD FOR LIMITING INRUSH CURRENT IN SOLID STATE DRIVES

CROSS REFERENCE TO RELATED APPLICATIONS

This application claims the benefit of U.S. Provisional Application No. 61/771,440, filed Mar. 1, 2013, the contents of which are incorporated herein by reference.

BACKGROUND OF THE INVENTION

The present invention relates in general to power supplies for electronic and computer systems employing backup power capability in the form of super-capacitors which allow the power supply to continue to function after main power has failed.

As electronic and computerized systems are increasingly used in all aspects of daily life, so has the requirement for such systems to be available twenty-four hours a day and seven days a week, and to be able to continue to function in the event of other system failures such as interruptions or failures of national grid power.

Large systems are often protected by backup power systems using battery power or diesel generators. Smaller systems such as computer servers may also protect against failure at a local level by using redundancy in the form of running twin identical servers and allowing seamless switching from one to the other (also called "failover"), or using redundant arrays of storage disks (termed "RAID").

With storage systems, the use of solid-state disks (SSDs) is becoming more prevalent due to their advantages in terms of speed and performance. SSDs employ a form of non-volatile memory, often in the form of SSD devices known as NAND flash memory (chips), and due to the requirement to present such memory as though it were a traditional hard disk drive, a memory controller is required to perform a translation of the hard disk protocols to instructions to read and write the memory. This operation requires a memory controller to use large translation and mapping tables and other metadata to assist in this process. For reasons of speed and performance, these tables are normally read from the flash memory at initial power-on, then stored in volatile RAM memory. In order not to affect performance, the data in RAM is only periodically flushed back to flash memory and when the system is properly shut down.

An SSD is therefore exposed to a window of time wherein the user data and the translation and mapping tables and metadata are not consistent. If the power to the drive were to be suddenly removed from the drive during this time, the up-to-date translation/mapping tables and metadata in RAM may be lost and unrecoverable. The result may be that when the SSD next powers up, it may not be possible to reconcile the user data and translation/mapping tables and metadata stored in flash memory, and user data may be lost.

To prevent data loss, it is now common to employ a backup power supply for an SSD, generally located on the same circuit board as the memory controller and flash memory devices. This severely limits the size and amount of power the backup supply can provide and batteries are generally too bulky.

However, the main requirement is to supply enough power to keep the SSD running for enough time to allow it to flush all the unsaved data from RAM to the flash memory, so that the metadata can be brought into synchronization with the user data. This has allowed for the use of relatively small backup power components, for example, capacitors commonly known as super-capacitors. Super-capacitors have capacitance values up to 10,000 times that of normal electrolytic capacitors, but much less power capacity (e.g., about 10%) of a conventional backup battery. Super-capacitors do, however, have a much higher energy density than a conventional backup battery and can therefore satisfy the requirement for a short term backup supply in a small volume that can be readily fitted into an SSD package.

Power circuits have therefore been developed for SSDs which merge super-capacitors with a DC to DC converter which supplies the various regulated DC voltages (such as 3.3V) required by the SSD, its controller and the flash memory, from the incoming main power supply voltages, which are typically 5V and 12V.

These circuits generally employ sequencing of the application of power using a power management device such that the super-capacitors are powered up first, then the DC-DC converter, and finally the output regulated voltages to the components.

A major consequence of adding super-capacitors is that extra inrush current limiting must be employed as the large values of capacitance and low internal resistance means that large currents will otherwise flow over a relatively long time as the super-capacitors charge up at power on. The current limiting may need only consist of a resistor and diode Without super-capacitors, some form of current limiting or slow start-up circuitry may still be required for the DC-DC converter, although while the input capacitance of the DC-DC converter will be less, the solution should be capable of supplying sufficient current for normal operation whilst not consuming power, which will involve a more sophisticated and expensive solution than a simple resistor.

Current limiting is known in the prior art is for connecting a power supply to a DC-DC converter and may be based on using current limiting resistors in parallel with switches (mechanical and electronic) such as in U.S. Pat. No, 5,087, 871 (Losel) and U.S. Pat. No. 6,646,842 (Pan et al).

There is an ongoing need for systems and methods suitable for reducing an inrush current for a power supply with both backup super-capacitors and a DC-DC converter.

BRIEF DESCRIPTION OF THE INVENTION

The present invention provides systems and methods suitable for limiting an initial rush of current into solid state drives (SSDs) that employ super-capacitors as a backup power supply to a DC-DC converter of the solid state drive.

According to one aspect of the invention, a system to regulate a current to a capacitive load from a power supply connected to the capacitive load includes a first switch between the power supply and the capacitive load, electrically connecting the capacitive load to the power supply in a closed position thereof, and electrically disconnecting the capacitive load from the power supply in an open position thereof. A super-capacitor is configured for charging by the power supply and powering the capacitive load. A current limiting circuit between the super-capacitor and the power supply is provided, electrically connecting the super-capacitor to the power supply in a closed position thereof, and electrically disconnecting the super-capacitor from the power supply in an open position thereof. A second switch is provided between the super-capacitor and the capacitive load, electrically connecting the super-capacitor to the capacitive load in a closed position thereof, and electrically disconnecting the super-capacitor from the capacitive load in an open position thereof. A power control circuit is configured to control opening and closing of the first switch and the second switch independently, sense a voltage of the power supply, and sense a voltage of the super-capacitor.

According to another aspect of the invention, a method of regulating a current from a power supply to a capacitive load includes electrically connecting the capacitive load to the power supply through a super-capacitor when power initially begins transferring from the power supply to the super-capacitor. The super-capacitor is electrically connected to the power supply by a current limiting circuit and is charged by the power supply. The super-capacitor is electrically disconnected from the capacitive load if the super-capacitor reaches a charged state, and the power supply is subsequently electrically connected to the capacitive load without the super-capacitor being electrically connected therebetween.

Technical effects of the system and method described above preferably include the ability to limit the inrush of current in a solid state drive while incorporating super-capacitors capable of providing backup power to a DC-DC converter. In particular, it is believed that, by providing a switch which normally enables the super-capacitors to supply power to the DC-DC converter in the event of main power failure to also be employed at the time that the main power is switched on to charge the both the super-capacitors and input capacitors of the DC-DC converter, the current rush will be reduced when main power is applied to the DC-DC converter after the super-capacitors have been sufficiently charged.

Other aspects and advantages of this invention will be better appreciated from the following detailed description.

BRIEF DESCRIPTION OF THE DRAWINGS

FIG. 1a shows an inrush current limiter circuit using a switch and current limiting resistor according to the prior art.

DETAILED DESCRIPTION OF THE INVENTION

Figure 1B:
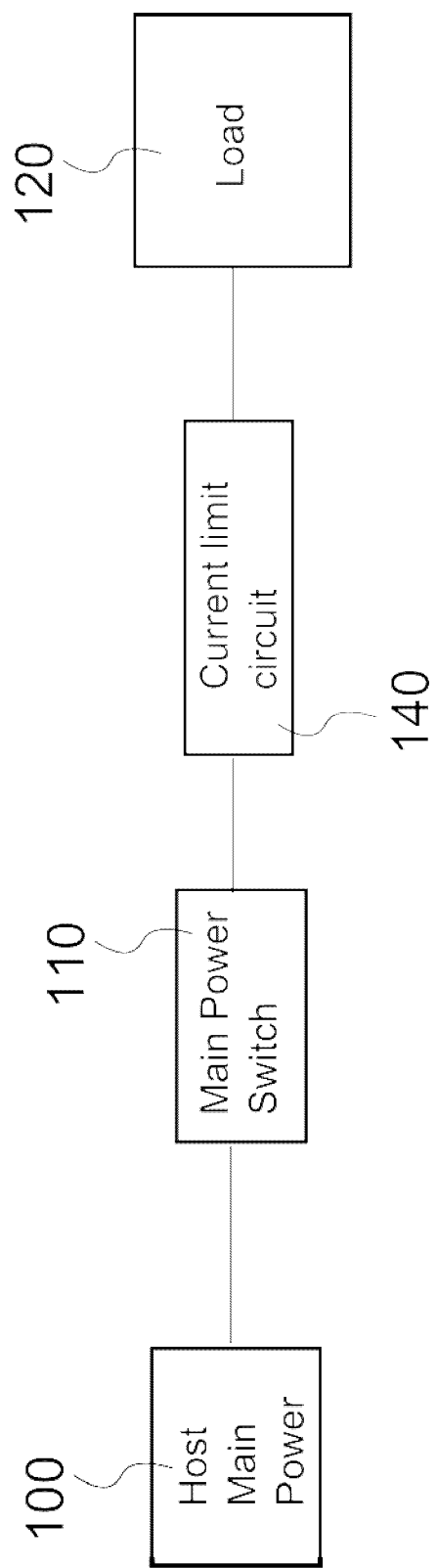
FIG. 1b shows an inrush current limiter circuit using a switch and current limiting circuit according to the prior art.

The present invention is generally applicable to non-volatile solid state drive (SSD) mass storage devices. An aspect of the present invention is to be able to use a power management system to reduce an inrush current of a DC-DC power converter of an SSD storage device wherein the system also employs super-capacitors to provide a back-up power source to the DC-DC power converter. In particular, preferred embodiments of the present invention utilize the same circuitry for both the inrush current limitation and for the backup power source.

Referring to FIG. 1a, a known configuration in the prior art comprises connecting a main power source 100 to a capacitive load 120 (e.g., a DC-DC converter connected to an SSD) via a main power switch 110, where a current limiting resistor 130 is placed in parallel with the main power switch 110. If the main power switch 110 were closed at the time the main power is connected, then a high inrush current would flow, which would decline as the capacitance in the load charges up. Instead, the main power switch 110 is open when the main power 100 is connected. A current still flows but is limited by the resistor 130. The maximum current is given by the output voltage of the main power source 100 divided by the value in Ohms of the resistance 130. The current will decline as the internal capacitance of the load 120 charges up and settles at a value given by the output voltage divided by the total value of the resistor 130 plus the internal resistance of the load 120. There will be a small voltage drop across the current limiting resistor, but at this time the switch 110 can be closed whereupon there will be a small current surge due to the smaller voltage difference than when the main power is initially connected, but this will be greatly reduced compared to any voltage surge that would have occurred had the current limiting resistor 130 not been used.

In FIG. 1b an alternative schematic circuit is shown, where an electronic current limiting circuit 140 is used in series between the power switch 110 and the load 120. In this arrangement, the current limit can be electronically controlled and, by using an active (semiconductor) controller device, can be arranged to gradually switch from presenting a current limiting resistance at initial turn on to almost no resistance in normal operating mode.

In a conventional SSD, such sophisticated measures may not be necessary, as the inrush current may be well within the parameters of the main power supply. However, with the addition of a super-capacitor backup supply, some measures are likely needed as the super-capacitor will consume a large current over a longer period of time than a regular capacitor due to its low internal resistance and very large capacity measured in Farads rather than microFarads. This initial inrush current due to the super-capacitor can be comparable to short circuiting the main power supply.

Figure 2:
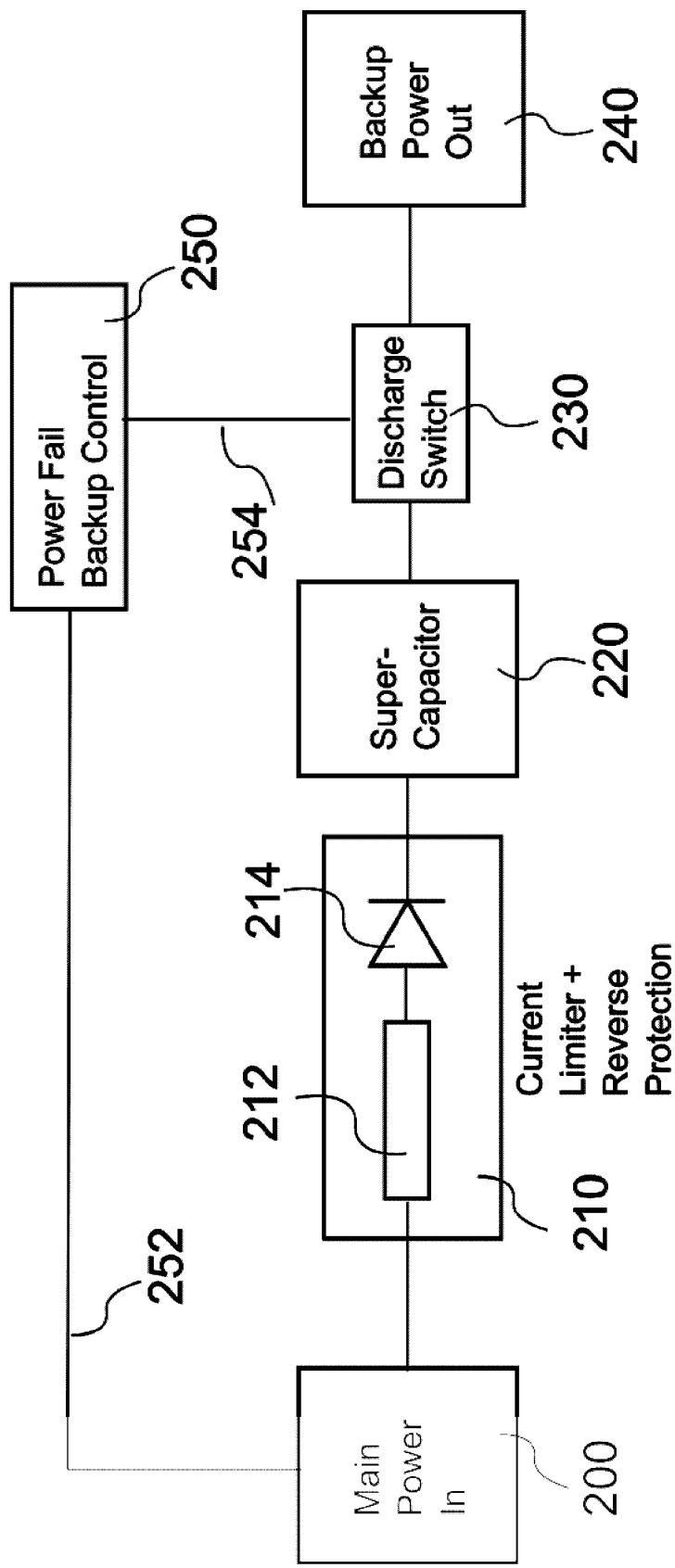
FIG. 2 shows an inrush current limiter used with a super-capacitor, according to the prior art.

FIG. 2 shows a simple arrangement known in the prior art to provide current limiting for a super-capacitor acting as a backup supply. At switch on and during normal operation, the main power input 200 charges the super-capacitor 220 via a current limiting device 210 comprising a resistor 212 and a reverse protection diode 214. The resistor 212 can be adjusted to a value that provides a compromise between changing time and power dissipated during initial charging, which may last only a number of seconds. During normal operation, the power supply compensates for any small leakage of charge from the super-capacitor as the discharge switch 230 is open and therefore very little current is drawn through the current limiting device 210 and a commensurately small amount of power is dissipated by the resistor 212.

The purpose of the super-capacitor 220 is to provide backup power to the backup power output terminal 240 when the main power in 200 fails. In this case, a power fail backup control device 250 senses a voltage drop via a sense line 252 and causes the discharge switch 230 to close via a control line 254 and the current flows through the discharge switch 230 to provide the backup power output terminal 240. The main power input 200 which has failed will be at zero volts and the diode 214 prevents the super-capacitor discharging to ground through the resistor 212.

This simple and low cost solution works because, unlike a circuit to reduce the inrush to an always-active load, no extra switch is required in parallel to the current limiting resistor in order to reduce power dissipation by the resistor in normal operation and the initial inrush. In normal operation, very little current is drawn and the voltage on the super-capacitor asymptotically reaches the power supply voltage, minus a small voltage drop, generally of a few hundred millivolts, due to the diode 214.

Typically in an SSD, the main power is used to drive a DC-DC converter, where a current limiting arrangement such as in FIG. 1a or 1b could be used. If a super-capacitor backup were added, additional current limiting would be necessary for the super-capacitor in a manner generally according to FIG. 2. Consequently, two separate forms of current limiting would be employed at the same time.

According to an aspect of the present invention, when a super-capacitor based backup supply is used with an SSD, the current inrush limiter for the super-capacitor may be used to pre-charge the capacitors of the DC-DC converter's input capacitors and thereby reduce the current inrush when the main power is applied to the DC-DC input capacitors. Such as arrangement avoids having separate current limiting for the DC-DC converter and instead has a single common inrush current limiter circuit.

Figure 3:
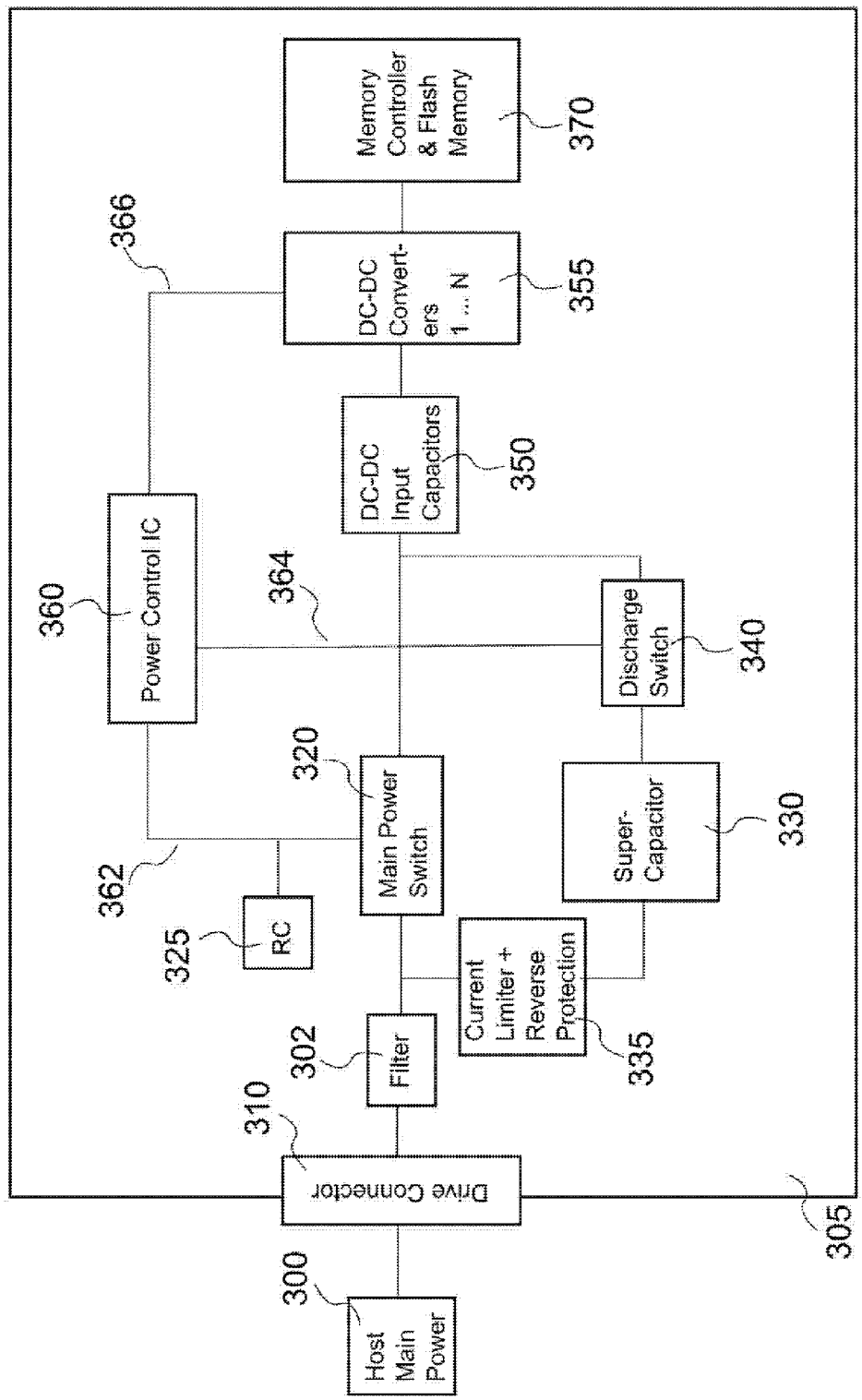
FIG. 3 shows a schematic circuit of an inrush current limiter combined with a super-capacitor backup supply according to an aspect of present invention.

FIG. 3 shows one possible arrangement of the present invention. An SSD 305 is electrically connected to the main host power 300 via a circuit board drive connector 310. The circuit board drive connector 310 is electrically connected to the DC-DC converters 355 by a serially connected chain of a power filter 302, a main power switch 320, and the DC-DC converter input capacitors 350. In the prior art, a current limiter would normally be electrically connected between the main power switch 320 and the DC-DC input capacitors 350 or incorporated into the main power switch 320. Instead, in the present invention the backup power super-capacitor 350 may be electrically connected to the main power through a current limiter with reverse current protection 335 and to the DC-DC input-capacitors via a discharge switch 340.

During normal operation, the power control integrated circuit (IC) 360 may use the control signal 362 to keep the main power switch closed and the signal 364 to keep the discharge switch 340 open, and to control the DC-DC converters via control line 366. When a failure of the host main power 300 occurs, sensed by line 362, the power control IC 360 uses line 364 to close the discharge switch 340 and open the main power switch 320, allowing the super-capacitor 330 to now supply power through the discharge switch 340 to the DC-DC input capacitors 350, which in turn allows the DC-DC converters 355 to continue to function for a sufficient time for the memory controller and flash memory 370 to perform operations which can ensure the consistency of data on the SSD 305.

In addition to the above, the discharge switch 340 may be utilized for an alternative purpose, such that when the SSD 305 is first connected to the main host power 300 via the drive connector 310, the power control IC 360 ensures the main power switch 320 is open by default, but the discharge switch 340 is close. Therefore, the super-capacitor 330 charges via its current limiter and reverse protection 335, but as the discharge switch 340 also connects the DC-DC input capacitors 350 through the super-capacitor 330, the DC-DC input capacitors 350 are charged at the same time. The DC-DC input capacitors 350 are relatively small in capacity and have higher internal resistance than the super-capacitor 330 and therefore are believed to have little effect on the time taken to charge the super-capacitor 330.

When the power control IC 360 senses that the super-capacitor 330 has reached its maximum voltage, the DC-DC input capacitors 350 will have reached the same value which will be close to the main power voltage. At this point, the discharge switch 340 may be opened and the main power switch 320 closed. Since the voltage of the DC-DC input capacitors 350 is already close to the main power voltage, any inrush current to the DC-DC input capacitors 350 is believed to be considerably reduced. Any residual inrush can be further reduced by connecting an RC circuit 325 comprising a resistor and capacitor in serial to the control line 362 of the main power switch 320, which applies a short time constant between the main power switch 320 being fully open to fully closed.

While the invention has been described in terms of specific embodiments, it is apparent that other forms could be adopted by one skilled in the art. For example, the physical configuration of the components could differ from that shown, and the assembly could differ in appearance and construction from the embodiments shown in the Figures. Therefore, the scope of the invention is to be limited only by the following claims.

The invention claimed is:

1. A system to regulate a current to a capacitive load from a power supply connected to the capacitive load, the system comprising:
   a first switch between the power supply and the capacitive load, electrically connecting the capacitive load to the power supply in a closed position thereof, and electrically disconnecting the capacitive load from the power supply in an open position thereof;
   a super-capacitor configured for charging by the power supply and powering the capacitive load;
   a current limiting circuit between the super-capacitor and the power supply, electrically connecting the super-capacitor to the power supply in a closed position thereof, and electrically disconnecting the super-capacitor from the power supply in an open position thereof;
   a second switch between the super-capacitor and the capacitive load, electrically connecting the super-capacitor to the capacitive load in a closed position thereof, and electrically disconnecting the super-capacitor from the capacitive load in an open position thereof; and
   a power control circuit configured to control opening and closing of the first switch and the second switch independently, sense a voltage of the power supply, and sense a voltage of the super-capacitor.

2. The system of claim 1, wherein if power is not being transferred from the power supply to the system, the first switch is in the open position thereof and the second switch is in the closed position thereof, and if the power control circuit senses power being transferred from the power supply to the system, the power control circuit ensures that the first switch remains in the open position thereof and the second switch remains in the closed position thereof.

3. The system of claim 2, wherein if the power control circuit detects that the super-capacitor has been charged by the power supply to a charged state, the power control circuit opens the second switch and closes the first switch.

4. The system of claim 1, wherein if the power control circuit senses a power failure of the power supply, the power control circuit closes the second switch and opens the first switch.

5. The system of claim 4, wherein if the power control circuit senses power being transferred from the power supply to the system subsequent the power failure, the power control circuit ensures that the first switch remains in the open position thereof and the second switch remains in the closed position thereof.

6. The system of claim 5, wherein if the power control circuit detects that the super-capacitor has been charged by the power supply to a charged state, the power control circuit opens the second switch and closes the first switch.

7. The system of claim 1, wherein the super-capacitor is a backup power supply to the capacitive load in the event the power supply fails.

8. The system of claim 1, wherein the capacitive load is a DC-DC converter.

9. The system of claim 1, wherein the system is part of a solid state drive.

10. The solid state drive of claim 9.

11. A method of regulating a current from a power supply to a capacitive load, the method comprising:
   electrically connecting the capacitive load to the power supply through a super-capacitor when power initially begins transferring from the power supply to the super-capacitor, the super-capacitor being electrically connected to the power supply by a current limiting circuit, the super-capacitor being charged by the power supply;
   electrically disconnecting the super-capacitor from the capacitive load if the super-capacitor reaches a charged state, and
   subsequently electrically connecting the power supply to the capacitive load without the super-capacitor being electrically connected therebetween.

12. The method of claim 11, further comprising supplying backup power to the capacitive load with the super-capacitor in the event the power supply fails by electrically connecting the super-capacitor to the capacitive load.

13. The method of claim 11, wherein the capacitive load is a DC-DC converter.

14. The method of claim 13, wherein the super-capacitor and DC-DC converter are component parts of a solid state drive.

15. A system configured to implement the method of claim 11, the system comprising:
   a first switch for electrically connecting the power supply to the capacitive load;
   the super-capacitor;
   the current limiting circuit for electrically connecting the super-capacitor to the power supply;
   a second switch for electrically connecting the super-capacitor to the capacitive load; and
   a power control circuit configured to control opening and closing of the first switch and the second switch independently, sense a voltage of the power supply, and sense a voltage of the super-capacitor.

16. The system of claim 15, wherein the capacitive load is electrically connected to the power supply through the super-capacitor by opening the first switch and closing the second switch.

17. The system of claim 15, wherein the power supply is electrically connected to the capacitive load without the super-capacitor being electrically connected therebetween by closing the first switch and opening the second switch.

18. The system of claim 15, wherein the capacitive load is a DC-DC converter.

19. The system of claim 15, wherein the system is part of a solid state drive.

20. The solid state drive of claim 19.

* * * * *